J. R. CLAY.
SHIP'S STEERING GEAR.
APPLICATION FILED FEB. 11, 1913.
1,100,420.
Patented June 16, 1914.
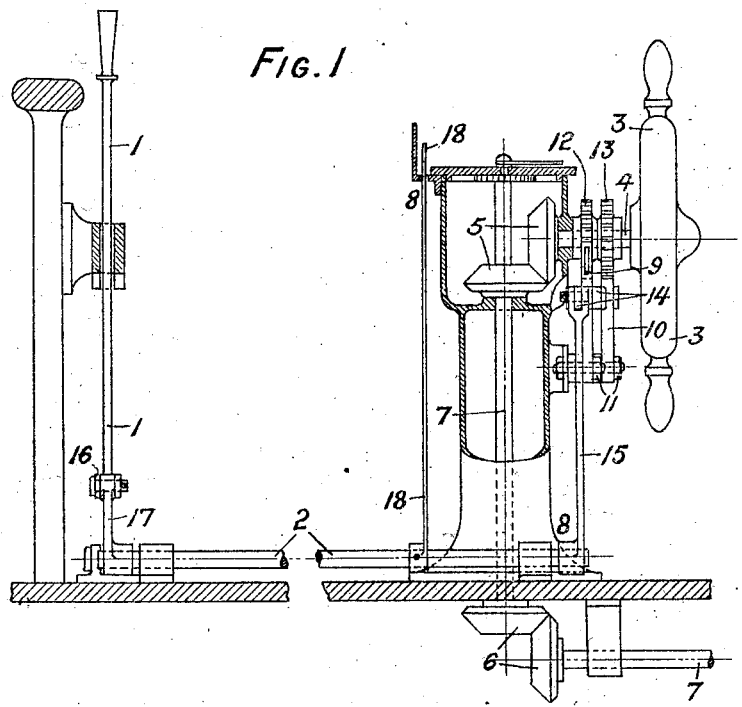
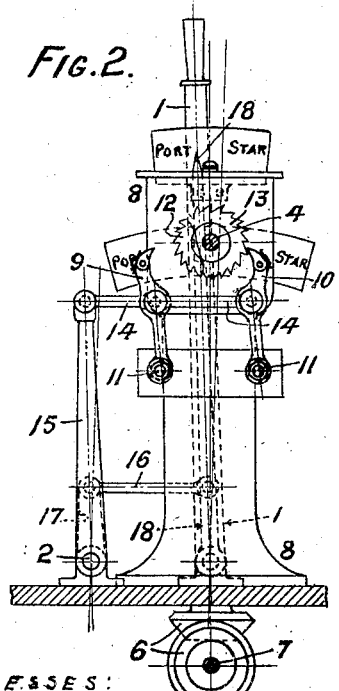
WITNESSES:
John C. Sanders
Albert F. Houman
INVENTOR:
James Richard Clay
BY
ATTY

UNITED STATES PATENT OFFICE.

JAMES RICHARD CLAY, OF BOOTLE, ENGLAND.

SHIP'S STEERING-GEAR.

1,100,420.  Specification of Letters Patent.  Patented June 16, 1914.

Application filed February 11, 1913. Serial No. 747,744.

*To all whom it may concern:*

Be it known that I, JAMES RICHARD CLAY, subject of the King of England, residing at Bootle, in the county of Lancaster, England, have invented new and useful Improvements Connected with Ships' Steering-Gear, of which the following is a specification.

This invention has reference to mechanism or machinery used on board ship for steering, wherein there is employed a locking means or mechanism by which the part connected with the steering gear, operated by the quartermaster, is prevented from being moved in the wrong way, on receiving an order from the man in charge of the ship; and it has for its object to provide an improved arrangement and construction of such machinery or mechanism for preventing mishaps taking place by the orders sent not being carried out.

In the steering gear of a ship having locking or preventive means operated by the commander or navigator of the ship, this locking or preventive means, namely, a pawl and ratchet mechanism, is combined with the pillar or stand on which the hand-wheel of a power steering gear is mounted; that is to say, this locking or preventive means is arranged and combined on the pillar or stand carrying mechanism which is operated by the quartermaster and which through shafting and gearing extending to the steering engine produces motion which is transmitted to the valve gear controlling the working and running of the steering engine, placed at the aft part of the ship; and when the captain, pilot, or other navigator of the ship gives a steering order from one direction or the other, he actuates the means or mechanism referred to operated by the quartermaster, and this operates a part or device in connection with this means or mechanism whereby it can only be turned or moved—and the steering engine started and run—in that direction which is ordered, and the means or apparatus in charge of the navigator has been moved or set. This means or mechanism is illustrated in the drawings, in Figs. 1, 2, and 3; Fig. 1 being a longitudinal sectional elevation, and Fig. 2 an end view of the means; while Fig. 3 shows a slightly modified construction; and the invention will be further described by the aid of these drawings.

A lever 1 (or an equivalent hand actuating means) is employed on or near the "bridge" say, and is connected by means of a shaft 2 with the apparatus or mechanism operated by the quartermaster, situated generally in the "wheelhouse" near the bridge, which mechanism consists of a steering wheel 3, mounted on a shaft 4, beveled wheels 5, 6, and shafting 7 which extends as usual to the valve operating gear of the steering engine; the beveled wheels 5 and vertical part of the shafting 7 being carried in the hollow column 8, which also supports the hand-wheel shaft 4.

The locking or preventive means shown consists of pawls 9, 10, hinged at 11 working in connection with two ratchet wheels 12, 13, with oppositely inclined teeth; the pawls 9, 10, being disposed on the opposite sides of these wheels and operating in connection with them. The pawls 9, 10, are connected together by a link 14, which is connected to the shaft 2 by an arm 15; and through this arm, motion of the lever 1 is transmitted to the pawls 9, 10; this motion of the lever 1 being transmitted to the shaft 2 through a connecting link 16, and an arm 17 on the shaft 2.

The pawls 9, 10, are so arranged that when one is in engagement with one of the ratchet wheels 12 or 13, the other is out. Thus, by this means, prevention of mishaps of the kind referred to is assured.

In connection with the steering wheel 3, and mechanism, an indicating finger, such as 18, working over a dial at the top of the column 8 may be used, so as to indicate by the movement of the parts operated by the navigator or commander, the direction in which he has moved the direction apparatus in his charge, and which has, by this act, operated the locking or preventive mechanism referred to. A means of any known suitable kind may be employed in connection with the apparatus, by which the hand lever 1 will be normally pressed and held to and in either the "port" or "starboard" position.

In some cases, instead of employing mechanical means for effecting the actions referred to, it may be done by electrical means, worked say by a lever, as 1, or its equivalent; suitable contacts and electric magnetic devices being employed to actuate the locking or preventive mechanism connected with the steering apparatus. Or again, it—the locking or preventive mechanism—may be effected by a pneumatic operating device, or a hydraulic operating device, and in such a case, it would be actuated by the lever 1 or its equivalent, substantially similarly as the mechanical apparatus shown in the drawings.

In the modification shown in Fig. 3 the lever 1 is directly mounted on the shaft 2, and the pawl device 9, 10, is in one, and mounted on the shaft 2 and has two pawl joints proper. Its action and effect is precisely similar to that of the apparatus shown in Figs. 1 and 2.

The apparatus as will be understood, will be used in conjunction with an ordinary steering telegraphic apparatus, between the bridge or place of command; and the wheel house or place of the steering gear wheel.

What I claim is:—

1. Steering gear of a ship comprising in combination a steering gear; a spindle fitted with a hand wheel for operating the gear, and with a pair of ratchet wheels having teeth oppositely formed; a pair of connected pawls disposed on opposite sides of the said spindle and each engaging with one of the ratchet wheels; lever mechanism connected with the pawls; and means connected with the lever mechanism for operating the same, and for moving the pawls to and from the ratchet wheels, substantially as described.

2. Steering gear of a ship, comprising in combination a steering gear; a pillar or stand 8 fitted with a spindle 4 and separate from the steering gear; a hand wheel 3 mounted on the spindle on the pillar or stand, for controlling the steering gear from a distance; oppositely arranged ratchet toothed wheels as 12, 13 on the wheel spindle; oppositely disposed pawls, as 9, 10 carried on pivots, and respectively placed on the opposite sides of said wheels and connected together; and a lever for simultaneously moving the said pawls upon their pivots toward and away from the ratchet wheels, by the lever being adapted to be operated by the commander or navigator from the bridge or place of command; substantially as herein set forth.

In testimony whereof I have signed my name to this specification in the presence of two subscribing witnesses.

JAMES RICHARD CLAY.

Witnesses:
SOMERVILLE GOODALL,
FRANK E. FLEETWOOD.